United States Patent
Lang

(10) Patent No.: US 7,435,942 B2
(45) Date of Patent: Oct. 14, 2008

(54) SIGNAL PROCESSING METHOD FOR OPTICAL SENSORS

(75) Inventor: Robert J. Lang, Alamo, CA (US)

(73) Assignee: Cypress Semiconductor Corporation, San Jose, CA (US)

(*) Notice: Subject to any disclaimer, the term of this patent is extended or adjusted under 35 U.S.C. 154(b) by 0 days.

(21) Appl. No.: 11/292,470

(22) Filed: Dec. 2, 2005

(65) Prior Publication Data

US 2006/0118743 A1  Jun. 8, 2006

Related U.S. Application Data

(60) Provisional application No. 60/632,557, filed on Dec. 2, 2004.

(51) Int. Cl.
    *H01J 40/14* (2006.01)
(52) U.S. Cl. .................. 250/221; 345/166; 382/107
(58) Field of Classification Search .......... 250/221, 250/559.32, 557; 345/166; 382/107
    See application file for complete search history.

(56) References Cited

U.S. PATENT DOCUMENTS

| | | | |
|---|---|---|---|
| 3,922,093 A | 11/1975 | Dandliker et al. | |
| 4,546,347 A | 10/1985 | Kirsch | |
| 4,799,055 A | 1/1989 | Nestler et al. | |
| 5,288,993 A | 2/1994 | Bidiville et al. | |
| 5,473,344 A | 12/1995 | Bacon et al. | |
| 5,578,813 A | 11/1996 | Allen et al. | |
| 5,644,139 A * | 7/1997 | Allen et al. | 250/557 |
| 5,703,356 A | 12/1997 | Bidiville et al. | |
| 5,729,008 A | 3/1998 | Blalock et al. | |
| 5,729,009 A | 3/1998 | Dandliker et al. | |
| 5,786,804 A | 7/1998 | Gordon | |
| 5,825,044 A | 10/1998 | Allen et al. | |
| 5,854,482 A | 12/1998 | Bidiville et al. | |
| 5,907,152 A * | 5/1999 | Dandliker et al. | 250/221 |
| 5,963,197 A | 10/1999 | Bacon et al. | |
| 5,994,710 A | 11/1999 | Knee et al. | |
| 6,031,218 A | 2/2000 | Piot et al. | |
| 6,037,643 A | 3/2000 | Knee | |
| 6,057,540 A | 5/2000 | Gordon et al. | |
| 6,097,371 A | 8/2000 | Siddiqui et al. | |
| 6,151,015 A | 11/2000 | Badyal et al. | |
| 6,172,354 B1 | 1/2001 | Adan et al. | |
| 6,194,695 B1 * | 2/2001 | Barrows | 250/208.1 |
| 6,225,617 B1 | 5/2001 | Dandliker et al. | |
| 6,233,368 B1 | 5/2001 | Badyal et al. | |

(Continued)

*Primary Examiner*—Georgia Y. Epps
*Assistant Examiner*—Kevin Wyatt
(74) *Attorney, Agent, or Firm*—William E. Nuttle

(57) ABSTRACT

A signal processing method is provided for sensing movement of an optical sensor relative to a surface. Generally, the method includes steps of: (i) generating sets of signals responsive to motion along each of a first, second, and third direction, the directions not necessarily all different, (ii) combining the sets of signals to generate a first complex signal for each direction at a first time; (iii) combining the sets of signals to generate a second complex signal for each direction at a second time subsequent to the first time; (iv) computing a third complex signal for each direction wherein each of the third complex signals is a predicted value for each of the second complex signals, the predicted signal depending on a number of values representing distance moved; and (v) determining optimum values of the values representing distance moved by minimizing differences between the second and third complex signals.

14 Claims, 9 Drawing Sheets

U.S. PATENT DOCUMENTS

| | | |
|---|---|---|
| 6,281,881 B1 | 8/2001 | Siddiqui et al. |
| 6,281,882 B1 | 8/2001 | Gordon et al. |
| 6,326,950 B1 | 12/2001 | Liu |
| 6,330,057 B1 | 12/2001 | Lederer et al. |
| 6,351,257 B1 | 2/2002 | Liu |
| 6,396,479 B2 | 5/2002 | Gordon |
| 6,421,045 B1 | 7/2002 | Venkat et al. |
| 6,424,407 B1 | 7/2002 | Kinrot et al. |
| 6,433,780 B1 | 8/2002 | Gordon et al. |
| 6,452,683 B1 | 9/2002 | Kinrot et al. |
| 6,455,840 B1 | 9/2002 | Oliver et al. |
| 6,462,330 B1 | 10/2002 | Venkat et al. |
| 6,476,970 B1 | 11/2002 | Smith |
| 6,529,184 B1 | 3/2003 | Julienne |
| 6,585,158 B2 | 7/2003 | Norskog |
| 6,603,111 B2 | 8/2003 | Dietz et al. |
| 6,621,483 B2 | 9/2003 | Wallace et al. |
| 6,657,184 B2 | 12/2003 | Anderson et al. |
| 6,664,948 B2 | 12/2003 | Crane et al. |
| 6,674,475 B1 | 1/2004 | Anderson |
| 6,677,929 B2 | 1/2004 | Gordon et al. |
| 6,703,599 B1 | 3/2004 | Casebolt et al. |
| 6,737,636 B2 | 5/2004 | Dietz et al. |
| 6,774,351 B2 | 8/2004 | Black |
| 6,774,915 B2 | 8/2004 | Rensberger |
| 6,795,056 B2 | 9/2004 | Norskog et al. |
| 6,809,723 B2 | 10/2004 | Davis |
| 6,819,314 B2 | 11/2004 | Black |
| 6,823,077 B2 | 11/2004 | Dietz et al. |
| 7,138,620 B2 | 11/2006 | Trisnadi et al. |
| 7,248,345 B2 | 7/2007 | Todoroff et al. |
| 2003/0058218 A1* | 3/2003 | Crane et al. .................. 345/158 |
| 2005/0179908 A1* | 8/2005 | Wada et al. .................. 356/496 |

* cited by examiner

SIGNAL PROCESSING METHOD FOR OPTICAL SENSORS

CROSS-REFERENCE TO RELATED APPLICATIONS

The present application claims the benefit of priority under 35 U.S.C. 119(e) to U.S. Provisional Patent Application Ser. No. 60/632,557 filed on Dec. 2, 2004, entitled A Signal Processing Algorithm For Two-Dimensional Optical Motion Sensors; which application is hereby incorporated by reference.

TECHNICAL FIELD

The present invention relates generally to optical navigation systems and more particularly to optical sensors and methods of sensing movement using the same.

BACKGROUND OF THE INVENTION

Data input devices, such as computer mice, touch screens, trackballs and the like, are well known for inputting data into and interfacing with personal computers and workstations. Such devices allow rapid relocation of a cursor on a monitor, and are useful in many text, database and graphical programs. A user controls the cursor, for example, by moving the mouse over a surface to move the cursor in a direction and over distance proportional to the movement of the mouse.

Computer mice come in both optical and mechanical versions. Mechanical mice typically use a rotating ball to detect motion, and a pair of shaft encoders in contact with the ball to produce a digital signal used by the computer to move the cursor. One problem with mechanical mice is that they are prone to inaccuracy and malfunction after sustained use due to dirt accumulation, etc. In addition, the movement and resultant wear of the mechanical elements, particularly the shaft encoders, necessarily limit the useful life of the device.

One solution to the above-discussed problems with mechanical mice has been the development of mice using an optical navigation system. These optical mice have become very popular because they provide a better pointing accuracy and are less susceptible to malfunction due to accumulation of dirt.

The dominant technology used today for optical mice relies on a light sources, such as a light emitting diode (LED), illuminating a surface at or near grazing incidence, a two-dimensional CMOS (complimentary metal-oxide-semiconductor) detector which captures the resultant images, and signal processing unit that correlates thousands of features or points in successive images to determine the direction, distance and speed the mouse has been moved. This technology provides high accuracy but suffers from a complex design and relatively high image processing requirements.

An alternative approach for measuring linear displacements uses an optical sensor having one-dimensional (1D) arrays of photosensitive elements, such as photodiodes, commonly referred to as a comb-array. The photodiodes within a 1D array may be directly wired in groups to enable analog, parallel processing of the received signals, thereby reducing the signal processing required and facilitating motion detection. For two-dimensional (2D) displacement measurements using this approach, multi-axes linear arrays have been proposed in which two or more 1D arrays are arranged along orthogonal axes.

In addition, many optical sensors having 1D arrays use a coherent light source, such as a laser, to illuminate a rough surface creating random interference pattern, called speckle. A speckle-based approach has several advantages, including efficient laser-based light generation and high contrast images even under illumination at normal incidence. Laser-based light generation has a high electrical-to-light conversion efficiency, and a high directionality that enables a small illumination footprint tailored to match a footprint of the array of photodiodes. Moreover, speckle patterns allow tracking operation on virtually any optically rough surfaces, affording broad surface coverage while maintaining the maximum contrast even under unfavorable imaging conditions, such as when the surface is "out-of-focus".

Although a significant improvement over prior art optical mice, these speckle-based devices have not been wholly satisfactory for a number of reasons. In particular, mice using the above technique have not demonstrated the accuracy demanded in state-of-the-art mice today, which generally must have a path error of less than 0.5%.

One problem with prior art speckle-based mice arising from image analysis of the speckle pattern is sensitivity of an estimation scheme to statistical fluctuations. The speckle pattern can be described by a superposition of eigenfunctions of translation operators. By picking out one or more particular eigenfunctions of translation in the optical navigation system, the amount of translation along one or more directions can be determined by determining the complex phase of the eigenfunction relative to an earlier measurement. Since the speckle pattern is random, there is a finite probability that any given eigenfunction will have no energy. Thus, if motion is being detected in one direction by correlating output from a single 1D array against a fixed eigenfunction, at some point in time the signal is going to drop or fade below a usable level, if not fade out entirely.

Furthermore, even if the optical sensor were to use two orthogonal arrays to detect two components of image motion, when one array fades in signal strength that component of the motion will be lost; or worse the system may pick-up a spurious component that was generated by noise rather than by actual motion. Since motion of the optical mouse is detected by computing the change in phase of a complex vector rotating in the complex plane, if the signal falls below a predetermined noise level, the optical sensor will appear to sense spurious rotations with large changes in phase as the complex signal fluctuates about the origin. These in turn will be translated by the optical navigation system into large distance errors.

Accordingly, there is a need for an optical sensor for detecting motion in one or more dimensions and a signal processing method for using the same that is capable of sensing movement with an acceptable path error (e.g. of less than 1%) in any direction (i.e. on-axis as well as off-axis directions). It is desirable that the method work with both optical sensors having one or more 1D arrays, and with those having one or more 2D arrays.

The present invention provides a solution to these and other problems, and offers further advantages over conventional devices and methods of using the same.

BRIEF DESCRIPTION OF THE DRAWINGS

These and various other features and advantages of the present invention can be understood more fully from the detailed description that follows and from the accompanying drawings, which however, should not be taken to limit the appended claims to the specific embodiments shown, but are for explanation and understanding only, where:

DETAILED DESCRIPTION

The present invention relates generally to optical navigation systems, and more particularly to signal processing methods for use in optical navigation systems with optical sensors for sensing motion relative to a surface over which the sensor is moved. Optical navigation systems can include, for example, an optical computer mouse, trackballs, a touch pad, scroll wheels and the like, and are well known for inputting data into and interfacing with personal computers and workstations.

In the following description, for purposes of explanation, numerous specific details are set forth in order to provide a thorough understanding of the present invention. It will be evident, however, to one skilled in the art that the present invention may be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "one embodiment" in various places in the specification do not necessarily all refer to the same embodiment. The term "to couple" as used herein may include both to directly connect and to indirectly connect through one or more intervening components.

It is to be understood that as used in this description a "complex signal" may itself be represented in multiple ways, e.g., as real and imaginary parts; as amplitude and/or phase; by 3 or more amplitudes; or by combinations of these schemes.

Introduction to Speckle-based Optical Sensors

Operating principles of speckle-based optical sensors will now be described with reference to FIGS. 1 and 2.

Figure 1:
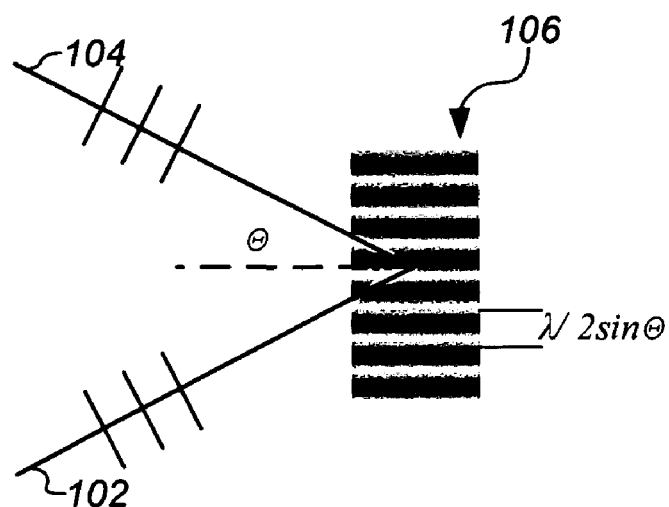
FIG. 1 illustrates a diffraction pattern of light reflected from a surface.

Referring to FIG. 1, laser light of a wavelength indicated is depicted as a first incident wave 102 and a second incident wave 104 to a surface, each making an angle of incidence θ with respect to the surface normal. A diffraction pattern 106 results which has a periodicity of λ/2 sin θ.

Figure 2:
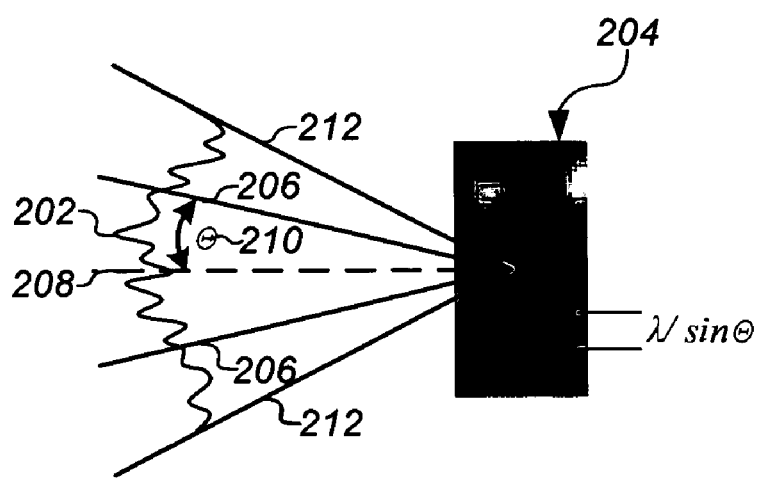
FIG. 2 illustrates a speckle in an interference pattern of light reflected from a rough surface.

In contrast, referring to FIG. 2, any general surface with morphological irregularities of dimensions greater than the wavelength of the incident light (i.e. roughly >1 μm) will tend to scatter light 202 into a complete hemisphere in approximately a Lambertian fashion. If a coherent light source, such as a laser is used, the spatially coherent, scattered light will create a complex interference pattern 204 upon detection by a square-law detector with finite aperture. This complex interference pattern 204 of light and dark areas is termed speckle. Preferably, as shown in FIG. 2, the main contribution for the measured speckle pattern 204 comes from rays 206 between the surface normal 208 and angle θ 210, not from the extreme rays 212. Speckle is essentially the random interference pattern generated by scattering of coherent light off of a rough surface and detected by an intensity photosensitive element, such as a photodiode, with a finite angular field-of-view or numerical aperture (NA). The exact nature and contrast of the speckle pattern depends on the surface roughness, the wavelength of light and its degree of spatial-coherence, and the light-gathering or imaging optics of the sensor. Although often highly complex, a speckle pattern is distinctly characteristic of a section of any rough surface that is imaged by the optics and, as such, can be employed to identify a location on the surface as it is displaced transversely to the laser and optics-sensor assembly.

Speckle is expected to come in all sizes up to the spatial frequency set by the effective aperture of the optics, conventionally defined in term of its numerical aperture NA=sin θ as shown FIG. 2. Following Goodman [J. W. Goodman, "Statistical Properties of Laser Speckle Patterns" in "Laser Speckle and Related Phenomena" edited by J. C. Dainty, Topics in Applied Physics volume 9, Springer-Verlag (1984)—in particular, see page 39-40.], the size statistical distribution is expressed in terms of the speckle intensity auto-correlation. The "average" speckle diameter is defined as:

$$a = \frac{\lambda}{\sin\theta} = \frac{\lambda}{NA} \tag{1.0}$$

where λ is the wavelength of the coherent light, NA is the numerical aperture of the photosensitive element, and θ is the angle of incidence.

It is interesting to note that the spatial frequency spectral density of the speckle intensity, which by Wiener-Khintchine theorem, is simply the Fourier transform of the intensity auto-correlation. The finest possible speckle, $a_{min}=\lambda/2NA$, is set by the unlikely case where the main contribution comes from the extreme rays 212 of FIG. 2 (i.e. rays at±θ), and contributions from most "interior" rays interfere destructively. The cut-off spatial frequency is therefore $f_{co}=1/(\lambda/2NA)$ or 2NA/λ.

Note that the numerical aperture may be different for spatial frequencies in the image along one dimension (say "x")

than along the orthogonal dimension ("y"). This could be caused, for instance, by an optical aperture which is longer in one dimension than another (for example, an ellipse instead of a circle), or by anamorphic lenses. In these cases the speckle pattern 204 will also be anisotropic, and the average speckle size will be different in the two dimensions.

One advantage of a laser speckle-based optical sensor is that it can operate with illumination light that arrives at near-normal incidence angles. Sensors that employ imaging optics and incoherent light arriving at grazing incident angles to a rough surface also can be employed for transverse displacement sensing. But, since the grazing incidence angle of the illumination is desired to create appropriately large bright-dark shadows of the surface terrain in the image, the system is inherently optically inefficient, as a significant fraction of the light is reflected off in a specular manner away from the sensor and thus contributes nothing to the image formed. In contrast, a speckle-based sensor can make efficient use of a larger fraction of the illumination light from the laser source, thereby enabling the development of an optically efficient displacement sensor.

Optical Navigation Systems

Figure 3:
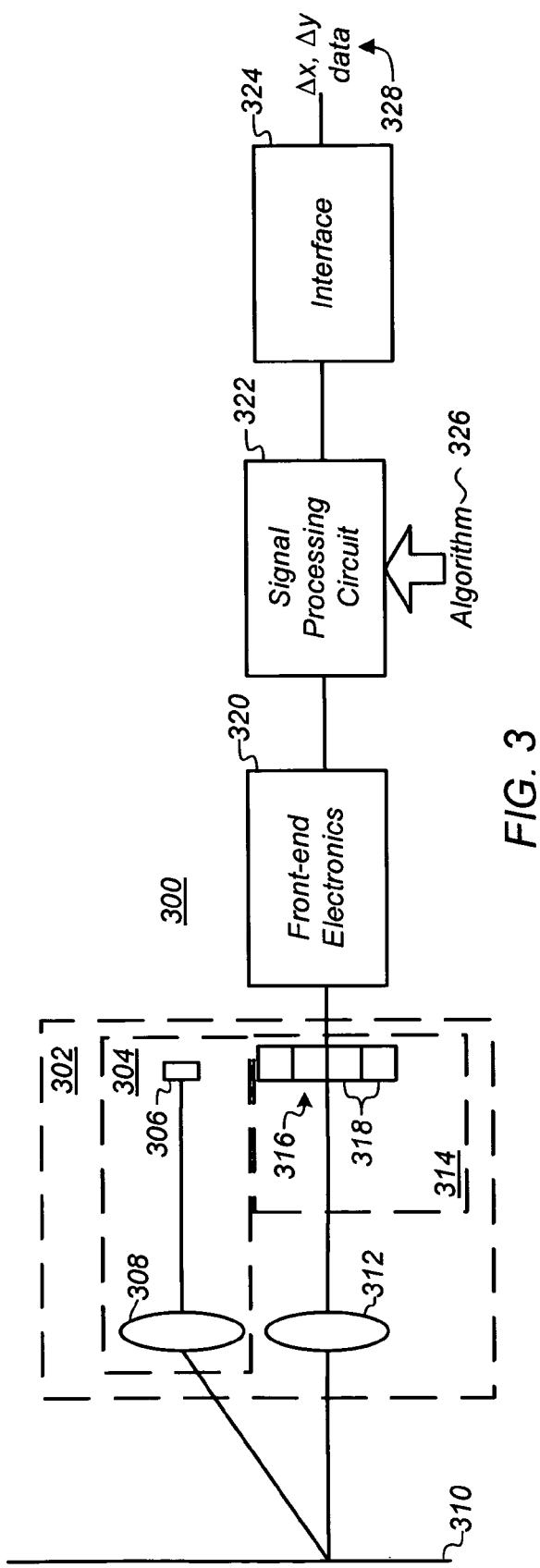
FIG. 3 is a functional block diagram of a speckle-based optical navigation system according to an embodiment of the present invention.

A functional block diagram of one embodiment of an optical navigation system for which the optical sensor and signal processing method of the present invention is particularly useful is shown in FIG. 3. Referring to FIG. 3, an optical navigation system 300 generally includes an optical head 302 having an illuminator 304 with a light source 306 and illumination optics 308 to illuminate a portion of a surface 310, imaging optics 312 to map or image a pattern of the by the surface, and an optical sensor 314 to sense or detect change in the pattern. The optical sensor 314 includes one or more one-dimensional (1D) or two-dimensional (2D) arrays 316 each having a number of photosensitive elements, such as photodiodes 318, on which light reflected from the surface 310 is received. The array(s) 316 may be configured to provide displacement measurements along two orthogonal axes, x and y. The optical navigation system 300 further includes front-end electrics 320, signal processing circuitry 322, and interface circuitry 324. Groups of photodiodes 318 in the array(s) 316 may be combined using passive electronic components in the front-end electrics 320 to produce group signals. These group signals may subsequently algebraically combined by the signal processing circuitry 322 using an algorithm 326 to produce to produce a signal providing information on the magnitude and direction of displacement of the sensor 314 in x and y directions. The signal may be converted by the interface circuitry 324 to produce Δx, Δy data 328 which may be output by the system 300.

Generally, the signal processing method of the present invention is applicable to both speckle and non-speckle based optical sensors having either multiple 1D arrays or 2D arrays. The 2D array may be either a periodic, 2D comb-array, which includes a number of regularly spaced photosensitive elements having 1D or 2D periodicity, a quasi-periodic 2D array (such as one having Penrose tiling), or a non-periodic 2D array, which has a regular pattern but doesn't include periodicities.

Figure 4:
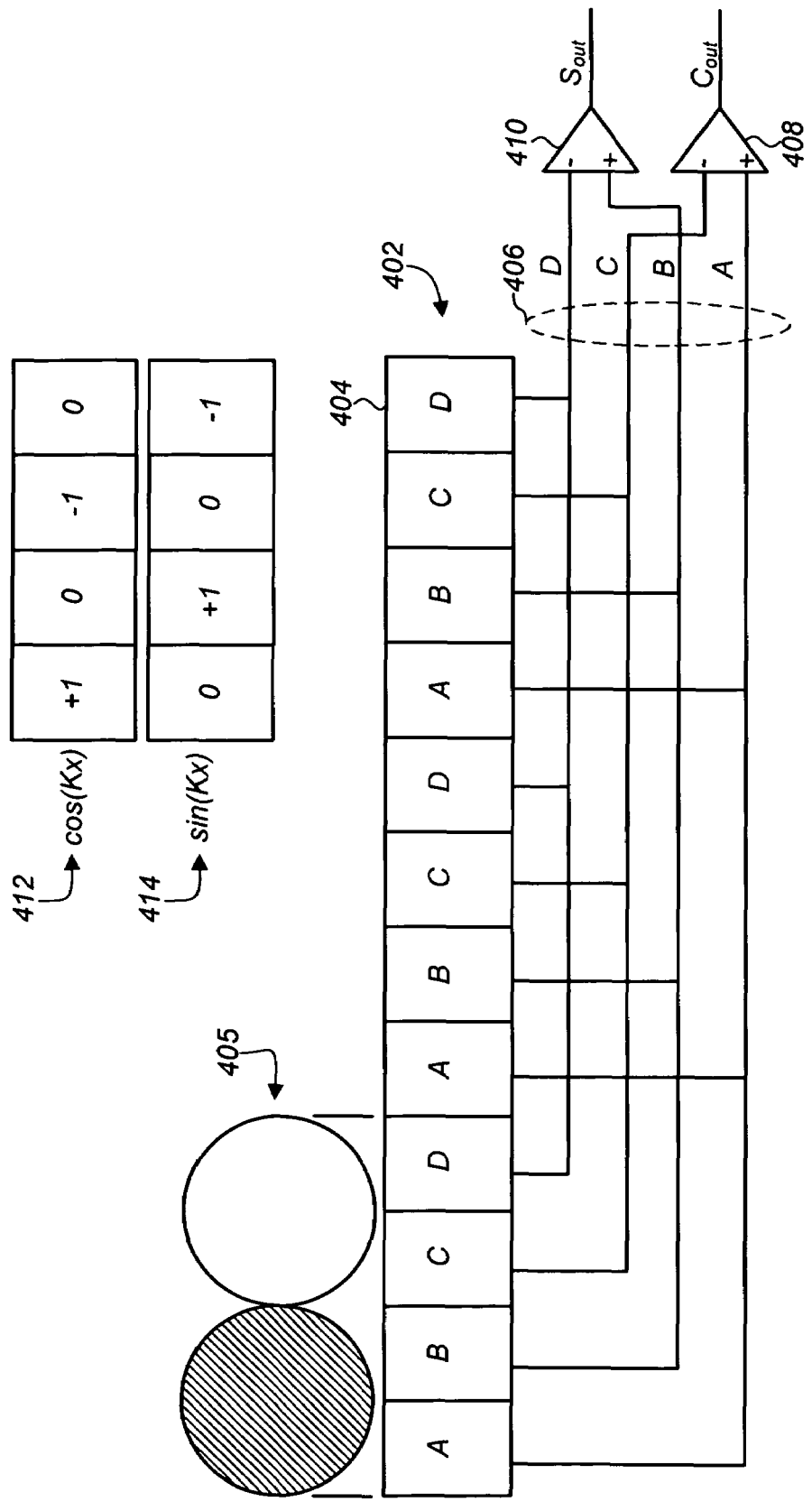
FIG. 4 is a schematic block diagram of a speckle based linear or one-dimensional (1D) comb-array having a four (4) photosensitive elements per period configuration, and for which a signal processing method according to the present invention is useful.

A linear or 1D comb-array is an array having multiple photosensitive elements that are connected in a periodic manner, so the array acts as a fixed template that interrogates one spatial frequency component of the signal. An embodiment of one such 1D comb-array is shown in FIG. 4. The connection of multiple photosensitive elements in a periodic manner enables the comb-array to serve effectively as a correlator at one spatial frequency K (defined by a pitch of the photosensitive elements in the array and the collection optics). FIG. 4 shows a general configuration (along one axis) of a 1D comb-array 402 of photosensitive elements, such as photodiodes 404, wherein the combination of interlaced groups of photosensitive elements serves as a periodic filter on spatial frequencies of light-dark signals 405 produced by the speckle (or non-speckle) images. In the embodiment shown, the 1D comb-array 402 in consists of a number of photodiode sets or periods, each having four of photodiodes 404, labeled here as A, B, C, and D. Currents or signals from corresponding or similarly labeled photodiodes 404 in each period are electrically connected (wired sum) to form four line signals 406 coming out from the array 402. Background suppression and signal accentuation is accomplished by using differential analog circuitry 408 to generate an in-phase differential current signal, labeled here as $C_{out}$, and differential analog circuitry 410 to generate a quadrature differential current signal, labeled here as $S_{out}$. Comparing the phase of the in-phase and quadrature signals permits determination of the magnitude and direction of motion of the 1D comb-array 402 relative to a scattering surface.

Referring to FIG. 4, the in-phase $C_{out}$ and the quadrature $S_{out}$ signals are obtained by taking the underlying speckle pattern and processing them according to the cosine and sine templates, 412 and 414 respectively. Preferably, the system is designed so that an optical "light-dark" signal pattern, i.e., speckle, has a size substantially equal to the period of the comb-array—four (4) photodiodes 404 or pixels in the embodiment of FIG. 4. The in-phase signal current is obtained from $C_{out}$=A–C, and the quadrature signal current from $S_{out}$=B–D as shown in FIG. 4.

Figure 5:
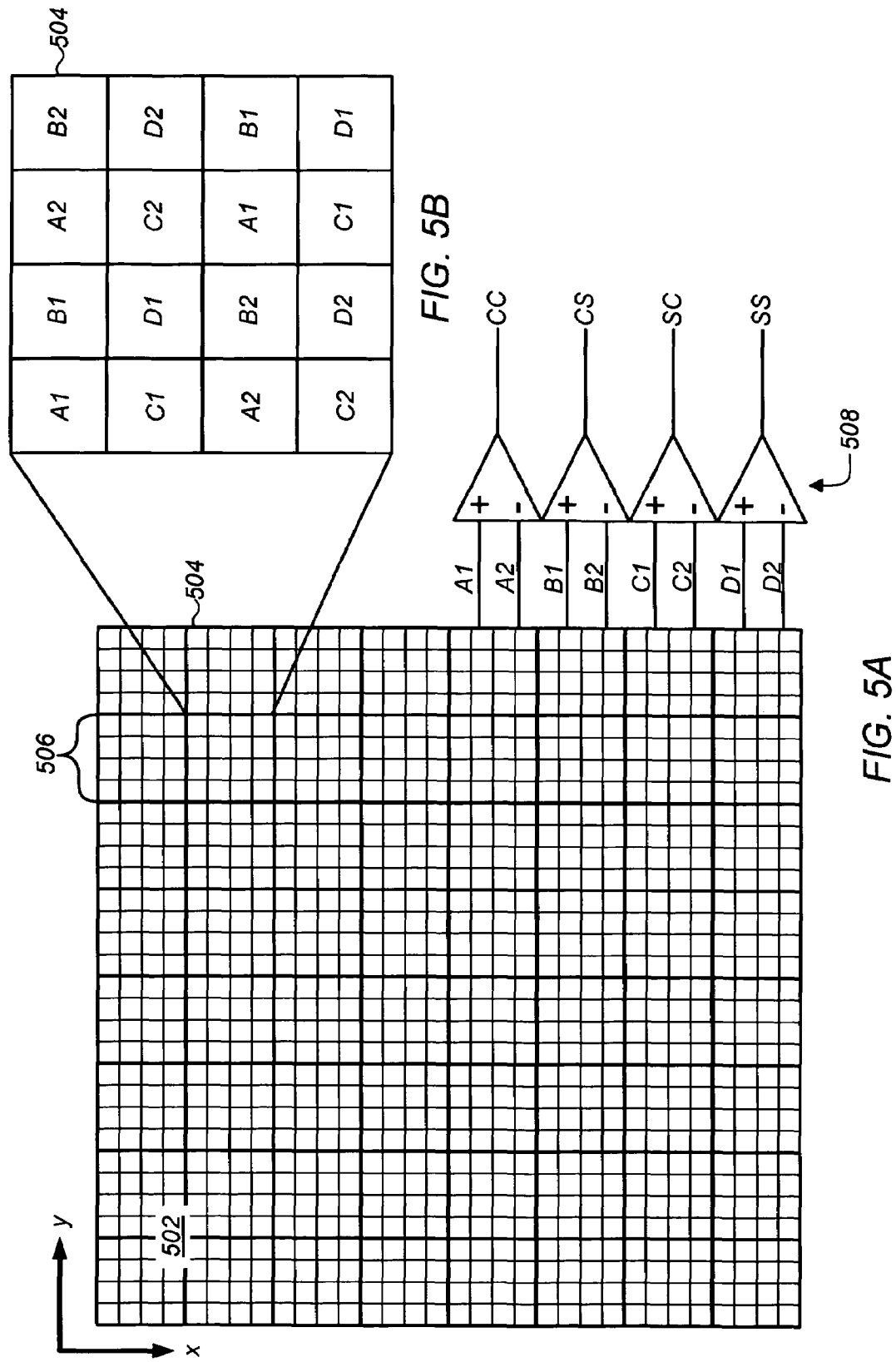
FIGS. 5A and 5B are schematic block diagrams of a 2D comb-array having photosensitive elements grouped in a 4×4 elements-per-cell configuration according to an embodiment of the present invention.

In a preferred embodiment the optical sensor includes the detectors or photosensitive elements are arrayed in two dimensions (2D), as shown in FIGS. 5A and 5B. The performance of the 2D comb detector array is expected to be superior to the 1D×1D case since each point in the image, in the average, traverses a much longer path inside the 2D detector active area in all directions and therefore contributes more to the displacement estimation. FIGS. 5A and 5B are schematic block diagrams of a 2D comb-array having photosensitive elements grouped in a 4×4 elements-per-cell configuration. Referring to FIGS. 5A and 5B, the 2D comb-array 502 has multiple photosensitive elements 504 arranged or grouped into cells 506, each cell having photosensitive elements grouped in a 4×4 elements-per-cell (or 4×4 elements/period) configuration. Photosensitive elements 504 within a cell 506 with the same letter and same number, as shown in the detail of FIG. 5B, as well as corresponding elements of all cells in the 2D comb-array 502 with the same number, are electrically connected or wired-sum to yield eight signals A1 through D2. The eight wired-sum signals are further combined with differential amplifiers 508 to provide four signals containing the in-phase and quadrature information in the x and y directions.

Although the detector or photosensitive elements shown in FIGS. 5A and 5B are equal in size and square, it will be understood that is a particular embodiment of a 2D array which is not necessary to practice the invention. Alternative embodiments of 2D array are described in greater detail below with reference to FIGS. 7 through 11.

Signal Processing Algorithms

Because of the random nature of speckle results in occasional fading of the energy in any given eigenfunction, it is desirable to provide some redundancy within the signal processing system by detecting more than the minimum number of eigenfunctions. To detect a single component of motion, i.e., 1-D motion, the minimum number of eigenfunctions is one, and thus it is desirable to detect two or more eigenfunctions to provide some redundancy. Similarly, to detect 2-D motion, the minimum number of eigenfunctions is two, and thus it would be desirable to detect three or more eigenfunctions to provide redundancy within the system. This redundancy can be provided in several ways: (i) by detecting eigenfunctions representing motion along different directions; (ii) by detecting eigenfunctions with different spatial frequencies or M-values; and (iii) by detecting eigenfunctions that are spatially separated within the plane of detection. It will be understood by those skilled in the art that these are all just variations of a common theme, i.e., all are examples of obtaining motion signals from two or more different eigenfunctions. Since the eigenfunctions are independent and orthogonal, the odds of fading in one are uncorrelated with the odds of fading in another eigenfunction. Thus, the odds of fading in both are much lower, and by simultaneously detecting more and more eigenfunctions, one can continuously lower the odds of all signals fading.

There are several schemes or approaches in which the redundant information provided by the use of more eigenfunctions than degrees of freedom of motion can be used to improve the quality of the motion signal.

One simple scheme is to use two or three M values (spatial frequencies) for each axis, and select the best or strongest signal for each axis at each moment in time. This strategy works to a degree, but it has some disadvantages. First, there is phase jitter in each main/quadrature pair that is known to have zero mean. Averaging over successive readings, the phase jitter averages out; but when the system switches from one signal source to another, a new phase jitter from the new source is introduced that does not necessarily average out with the last phase jitter from the previous source. This will add a new source of error to the measurements.

Yet another approach involves computing a motion vector from all eigenfunctions and performing a weighted average. But the proper weighting coefficient is not obvious. It seems intuitively clear that a stronger signal should be weighted more. Also, there is a strong non-linearity. In a strong signal, noise will cause only small fluctuations in the computed phase, but in a weak signal, noise can cause phase fluctuations of $2\pi$. That suggests that when the signal strength is below a certain threshold, its weighting factor should be very small. Therefore, there is a need for a weighting scheme, either explicit or implicit, that takes signal strength into account.

A more fundamental weakness of discarding signals is that there is useful information to be had in even a poor, noisy signal, and if noisier signals are simply discarded, information is needlessly lost, which could add to the accuracy or confidence in the computed signal.

A preferred approach takes advantage of the additional information available from all signals, including those that are poor or noisy. Even if three or more signals are contaminated by independent noise sources, all are describing a single phenomenon. Thus a uniform model for all three signals can be constructed from which it is possible to make use of all of available information, even that from a noisy source, and derive a better estimate of the motion.

Consider first the case of pure 1-D motion. It will be understood that the following description involves constructing main and quadrature signals which yield a complex amplitude that represents the field strength in the speckle pattern at a particular eigenfunction. Construction of these main and quadrature signals is described in greater detail, for example, in co-pending, commonly assigned U.S. patent application Ser. No. 11/261,316, filed Oct. 28, 2005 entitled "Two-Dimensional Motion Sensor", which is incorporated herein by reference in its entirety. These main and quadrature signals can be viewed as special cases of a more general set of main and secondary signals, which may comprise three or more signals; but for the moment only a single secondary signal, which is the quadrature signal will be considered.

Two successive measurements, separated in time are taken. For the first measurement a value c is measured, and for the second measurement a value $c'_i$. If there were no noise or errors $c'=\lambda c$, where $\lambda$ is the eigenvalue corresponding to the distance traveled. Thus, for movement in 1-D:

$$\lambda = \exp(2\pi i d f) \qquad (2.0)$$

where d is the distance traveled and f is the spatial frequency at which the measurements are made. However, there is noise, so this relationship between $c'_i$ and c is only approximate.

If multiple "before" and "after" measurements are made, e.g., from different, spatially separated arrays, or from a single array at multiple spatial frequencies, equation 2.0 is as follows:

$$c'_i \approx \lambda_i c_i = c_i \exp(2\pi i d f_i) \qquad (3.0)$$

where i is the index of a measurement from a particular array or at a particular spatial frequency.

It will be appreciated that although there are multiple "before" measurements ($c_i$) and "after" measurements ($c'_i$), and possibly multiple spatial frequencies ($f_i$), there is only one distance d that appears in all three equations. Thus, there is no reason to calculate a distance value from each of the three equations and average them according to some heuristic criteria. Rather, the fact that there is only one distance should be built into the analysis from the very beginning.

For each measurement, a "predicted" value of $c'_i$ is constructed that is a function of the distance moved. The predicted value is $c_i \exp(2\lambda i d f_i)$, which, of course, changes with the distance. To determine a single value of the distance for a given set of measurements, the best value of distance to use is the distance that gives the best fit to all of the various measurements. In other words, the RMS error between the predicted and measured "after" values is minimized, using all the available data. This is accomplished by finding the value of d that minimizes the following:

$$E(d) \equiv \sum_i |c'_i - c_i \exp(2\pi i d f_i)|^2 \qquad (4.0)$$

This is found by solving the minimization problem:

$$\frac{\partial}{\partial d} E(d) = 0 \qquad (5.0)$$

In general, equation 5.0 is a transcendental equation, with no analytic solution. However, since motion is in 1-D, a numerical solution can be found using, for example, Newton minimization.

The above method or algorithm has the advantageous property that it automatically applies the appropriate weighting, since stronger signals make a stronger contribution to the error signal E(d), without fully discarding information from any single measurement.

It should also be noted that this algorithm makes no assumption about continuity of motion from one sampling interval to the next. In this sense, it is complementary to further signal processing techniques such as Kalman filtering, which assume a known underlying stochastic differential equation. Thus, it is possible to apply Kalman filtering to the output of this algorithm to obtain further noise suppression over an interval.

The example given above is based on pure 1-D motion, but the approach can be readily generalized or extended to 2-D motion. In the following example it is assumed that: (i) general 2-D eigenfunctions are detected that detect motion along a particular direction defined by unit vector $r_i$ at spatial frequency $f_i$; and (ii) the pattern is shifted by distance $d_x$ in the x-direction and $d_y$ in the y-direction. A 1-D detection system will produce the eigenvalue:

$$\lambda_i = \exp(2\pi i(r_{i,x}d_x + r_{i,y}d_y)f_i). \tag{6.0}$$

Once again, the distance that minimizes the total error between the predicted and measured values is sought, but this will now be a 2-dimensional function:

$$E(d_x, d_y) \equiv \sum_i |c_i' - c_i \exp(2\pi i(r_{i,x}d_x + r_{i,y}d_y)f_i)|^2 \tag{7.0}$$

This is found by solving the following 2-D minimization problem:

$$\frac{\partial}{\partial d_x}E(d_x, d_y) = \frac{\partial}{\partial d_y}E(d_x, d_y) = 0 \tag{8.0}$$

Note that if sampling is taken within the Nyquist limit, this becomes a local minimization, i.e., a purely downhill search using Newton steps, for which an exact analytic expression can be computed.

Another advantageous property of the above method or algorithm it is possible to search beyond the Nyquist limit by using multiple incommensurate spatial frequencies. This benefit comes automatically with this algorithm, but it is necessary to use a global search algorithm to find the global minimum beyond the Nyquist limit and not get stuck in local minima within the Nyquist limit.

It will be appreciated that equation (7.0) is completely general, applying to any combination of 1-D axis measurements whether the axes are orthogonal, parallel, or mixed, it can be used with any 3 or 4-axes embodiments of a 2-D array as described below.

Generalization of Main and Secondary Signals

In the previous example, computing of the complex coefficient or signal $c_i$ was described by constructing it from main and quadrature signals. However, it is not necessary to use main and quadrature signals; one can use three or more signals, which can be generalized as main and secondary signals. Note, that there can be more than one secondary signal. Using three or more main and secondary signals for each eigenfunction can give improved redundancy within the system. It is now possible to describe now how to use a general set of main and secondary signals when such secondary signals are not a quadrature signal. Note that the complex signal $c_i$ is ideally computed from the speckle pattern $S(x,y)$ and an eigenfunction $\exp(-2\pi i(xf_x + yf_y + \phi_0))$ by the following equation:

$$c = \iint S(x,y)\exp(-2\pi i(xf_x + yf_y + \phi_0))dxdy, \tag{9.0}$$

where $\phi_0$ is an arbitrary phase factor.

However, this computation cannot be performed directly because these eigenfunctions and eigenvalues are complex quantities, but the speckle pattern $S(x,y)$ is real, and only possible to perform real arithmetic with detectors and weighting coefficients in hardware.

One solution is to compute the real and imaginary parts of the complex coefficient separately. That is:

$$c \equiv c_r + ic_i = \iint S(x,y)\Re[\exp(-2\pi i(xf_x + yf_y + \phi_0))]dxdy + \tag{10.0}$$
$$i\iint S(x,y)\Im[\exp(-2\pi i(xf_x + yf_y + \phi_0))]dxdy$$

Thus $\iint S(x,y)\Re[\exp(-2\pi i(xf_x + yf_y + \phi_0))]dxdy$ is identified as the "main" signal and $\iint S(x,y)\Im[\exp(-2\pi i(xf_x + yf_y + \phi_0))]dxdy$ as the "quadrature" signal.

The main and quadrature signal are the real and imaginary parts of the complex amplitude c, but can be viewed more generally as the projection of the complex amplitude onto two distinct axes in the complex plane. These two projections can be computed in a common way, as:

$$\iint S(x,y)\Re[u^*\exp(-2\pi i(xf_x + yf_y + \phi_0))]dxdy \tag{11.0}$$

where u* is the complex conjugate of u, which is a unit-magnitude complex number that defines the axis. For the main signal, u=1; for the quadrature signal, u=i.

It is also possible to use a set of three or more values of u, and compute three or more projections of the complex coefficient using equation (11.0). In this case, the predicted and measured errors described in equations (7.0) and (8.0) become vector-valued quantities in these projections. However, they still depend on only one or two distance variables, and the procedure of minimization of the total error, summed over all projections, would remain the same as is described above.

Figure 6:
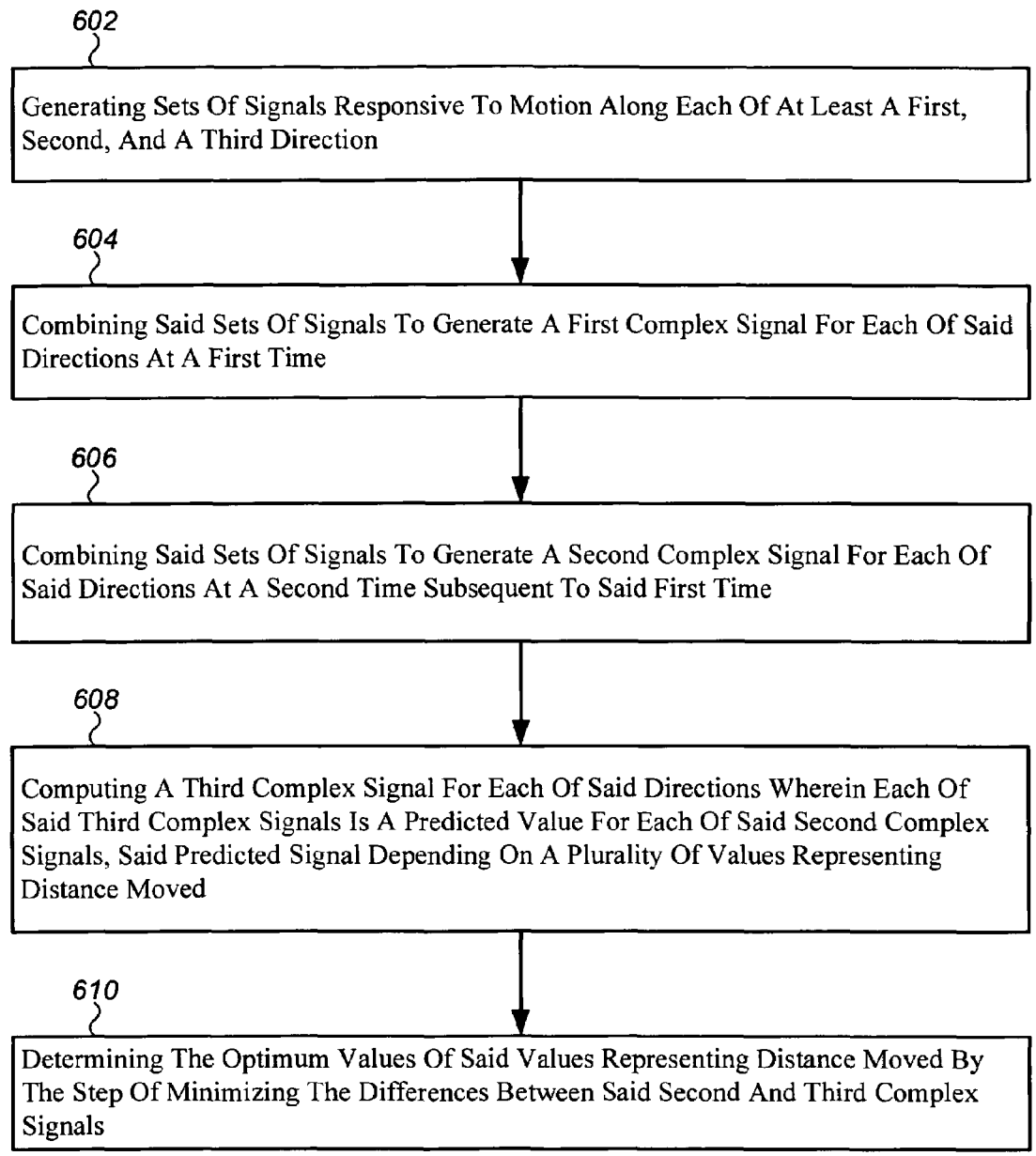
FIG. 6 is a flowchart of a signal processing method according to an embodiment of the present invention.

An embodiment of a method for detecting motion of an optical sensor relative to a surface along a number of directions, will now be described in greater detail with reference to FIG. 6. Referring to FIG. 6, the method generally includes steps of: (i) generating sets of signals responsive to motion along each of a first, second, and at least third direction, the directions not necessarily all different (602); (ii) combining the sets of signals to generate a first complex signal for each direction at a first time (604); (iii) combining the sets of signals to generate a second complex signal for each direction at a second time subsequent to the first time (606); (iv) computing a third complex signal for each direction wherein each of the third complex signals is a predicted value for each of the second complex signals, the predicted signal depending on a number of values representing distance moved (608); and (v) determining the optimum values of the values representing distance moved by the step of minimizing the differences between the second and third complex signals (610).

Preferably, each set of signals consists of a number of signals, including a main signal and one or more secondary signals. More preferably, the main and secondary signals represent at least partially independent components of a complex signal whose complex phase changes in response to motion along one of the directions.

Exemplary 2D Array Configurations

Certain embodiments of 2D optical sensors for which a signal processing method according to the present invention is useful will now be described in greater detail with reference to FIGS. 7 through 11.

There are a couple of different strategies or approaches that can be taken in configuration of the arrays. First, it should be reiterated that to detect motion in two-dimensions it is helpful to perform at least three 1D detections. It is desirable to have at least two 1D detections to obtain both components of motion in two-dimensions, but since speckle is complex, any given eigenfunction could fade out, causing the loss of a signal. It should be noted that no amount of filtering, e.g., Kalman filtering, can provide the correct motion if the user changes direction while the signal has faded. Thus, it is desirable to provide at least one more signal to give some level of resistance to fading. More, would be better of course, although the signal processing required for handling the extra information is more complicated, offsetting some of the advantages realized by using a speckle-based optical sensor having a 2D array. There is some flexibility in how to provide this redundancy including: (i) several spatially separated arrays (spatial redundancy); (ii) different spatial frequencies for a given direction (spatial frequency redundancy); and (iii) multiple axes using more than 2 different directions (directional redundancy)—in which case, of course, the computed motion values are no longer necessarily orthogonal.

For simplicity, in the following description any single motion component detected will be called a "signal/quadrature pair" (SQ-pair). If 2 or more SQ-pairs are to be detected an initial decision must be made as to how to the photosensitive elements in the array are used. In particular, the elements in the array can be connected so that: (i) any given photosensitive element feeds only one SQ-pair; (ii) the signal from every photosensitive element split and given different weighting coefficients, so that any given photosensitive element feeds every SQ-pair; or (iii) some combination of both (i) and (ii). Which approach is used involves in part a tradeoff between power budget and IC or chip size, since signal splitters and buffers consume both, while not using the information from every photosensitive element in every SQ-pair can reduce signal-to-noise ratio (SNR).

An ideal photosensitive element configuration for detecting pure, 1D motion will be considered first. The optimum configuration of the 2D array is having a photosensitive element everywhere with the weighting coefficient as follows:

$$w_{r,i} = \frac{B_i}{A_i} \cos(-2\pi(x_i f_x + \varphi_0)) \quad (12.0)$$

$$w_{i,i} = \frac{B_i}{A_i} \sin(-2\pi(x_i f_x + \varphi_0)) \quad (13.0)$$

Since the weighting coefficient doesn't depend at all on $y_i$, all photosensitive elements in a vertical column have exactly the same weighting coefficient. Alternatively, having a number of identical weighting coefficients can be avoided by just wiring together all photosensitive elements in vertical columns—or using tall, narrow photosensitive elements. The implication here is that using a 2D array that is as tall as it is wide will generally give the desired off-axis performance for 1D motion.

It is also noted that the cosine and sine have interleaved zeros. If the weighting coefficient is zero, then there is no need to waste a photosensitive element there, so if the photosensitive elements are spaced ¼ of a period apart, the photosensitive elements for the main and quadrature signals can be interleaved, with each photosensitive element only contributing to a single signal. So one preferred 2D array for 1D motion detection is photosensitive elements arranged in a number of vertical stripes, with alternating signals going to main and quadrature signals. Moreover, the stripes of photosensitive elements also do not need to be made continuous in the vertical direction, because the eigenfunction sought is continuous in the y direction. Thus, it is possible to sample the eigenfunction in y, by interrupting photosensitive elements in the y direction. Instead of making each photosensitive element in a continuous column, every other photosensitive element can be left out, leaving alternating blank rows. These blanks can now be filled in with two more sets of photosensitive elements designed to detect vertical motion. This is basically the symmetrical 2D comb-array having axes in the x and y direction, which has been described above with respect to FIGS. 5A and 5B. However, it should be pointed out that it is possible to construct similarly interleaved 2D arrays having axes in more than 2 directions. For example, FIG. 7 shows a hexagonal array 702, interleaved and wired to produce three (3) 1D SQ-pairs along axes 704, 706, and 708, separated by 120°.

Figure 7:
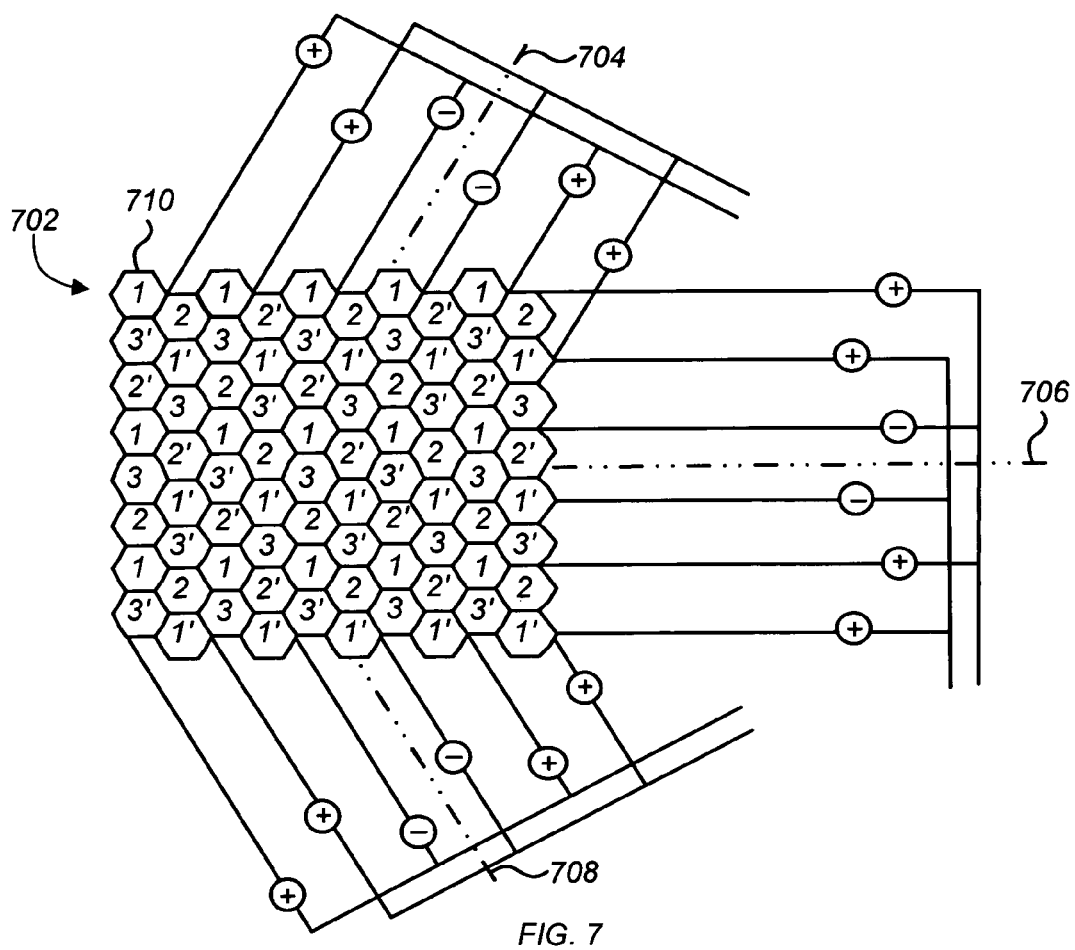
FIG. 7 is a schematic block diagram of an optical sensor having a 2D array of hexagonal photosensitive elements, wired to detect 1D motion along three different axes according to another embodiment of present invention.

Referring to FIG. 7, a grid of hexagonal photosensitive elements 710 is wired to sense 1D motion the along three different axes 704, 706, 708. Photosensitive elements 710 associated with each axis for detecting the in-phase signal are indicated by the same numbers, 1, 2, or 3. Alternating rows of photosensitive elements 710 for detecting the quadrature signal are indicated by like numbers, 1', 2', and 3'. In-phase and quadrature signals from photosensitive elements arranged along each axes 704, 706, 708, are wire-summed, with alternate signs indicating the in-phase (+) and quadrature (−) signals.

One weakness of any interrupted array of photosensitive elements arises from the fact that the signal is sampled, and therefore is susceptible to aliasing. In particular, an interrupted array will pick up any spatial frequencies that are at multiples of the underlying period of the photosensitive elements.

The effect of aliasing can be reduced by using the signal from every photosensitive element, i.e., splitting each element output and sending a copy to every 1D SQ-pair. This increases the sampling rate (since every photosensitive element is used, rather than every $2^{nd}$ or $3^{rd}$ element in a row), and also means using a smoother sampling function (since the sampling function is not a series of delta functions, but rather is convolved with a step function, which suppresses higher harmonics). Nevertheless, some confounding aliased contributions are to be expected if the optical pattern contains strong periodicities, e.g., from a woven cloth or patterned surface.

A way to reduce the susceptibility to aliasing would be to use a completely non-periodic array, and in particular, an array that has no strong peaks at any spatial frequency. One could obtain this by using a pseudo-random distribution of photosensitive elements to blur out periodicities, or by using a regular pattern that doesn't include periodicities. In such an aperiodic array, it is generally desirable to use the output from every photosensitive element, since there are no fortuitous zeros that would allow interleaving sets of element at little or no cost.

Figure 8:
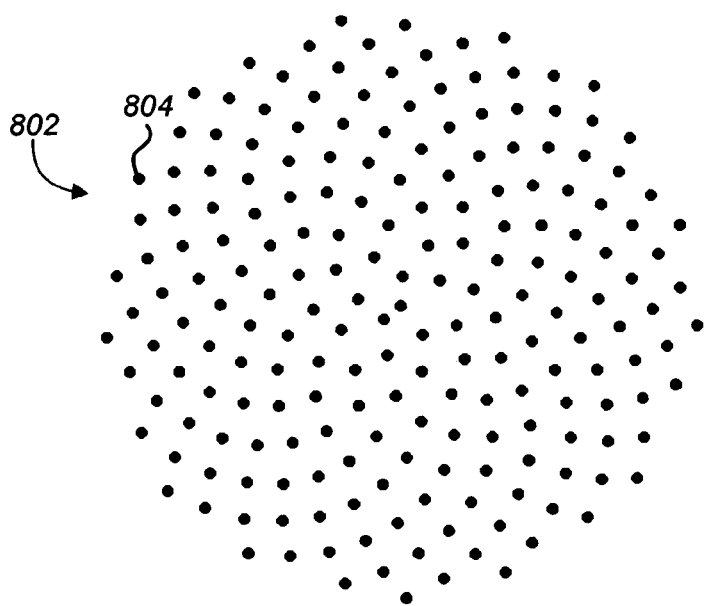
FIG. 8 is a dot pattern for a non-periodic phyllotactic array of photosensitive elements according to yet another embodiment of the present invention.
Figure 9:
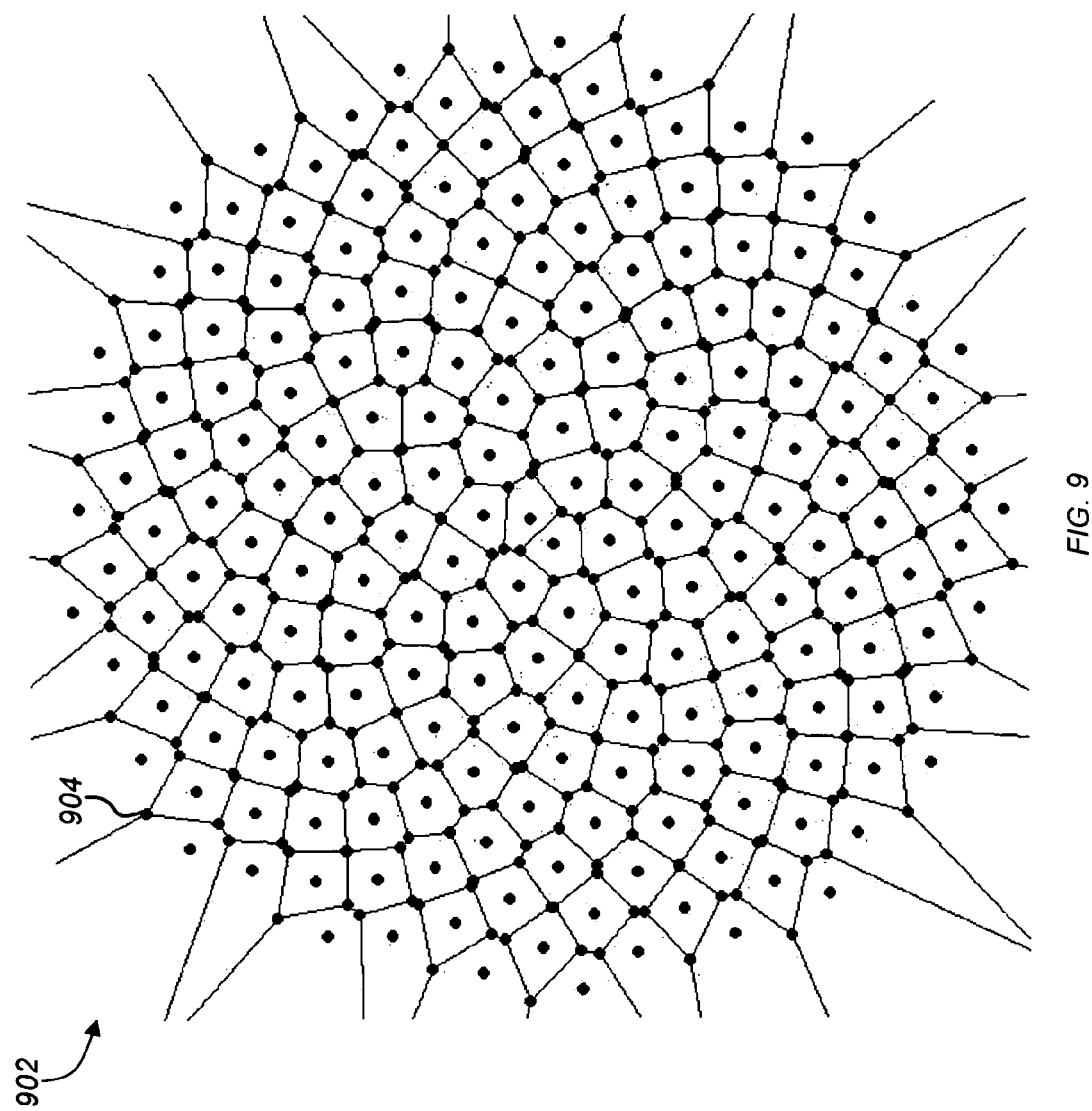
FIG. 9 is a Voronoi diagram showing the photosensitive element pattern for the phyllotactic array of FIG. 8.

A particularly interesting aperiodic pattern is the so-called phyllotactic array, or "sunflower" array. It has a couple of nice properties: it is based on the Golden Ratio, which is the most irrational of all numbers, meaning it minimizes the height of higher harmonics in its spectrum. It is also fairly easy to generate. In polar coordinates, the jth point is located at $$(\rho_j, \phi_j) = \left( C\sqrt{j}, \frac{2\pi j}{\Phi} \right) \quad (14.0)$$

where Φ is the golden ratio, 1.618 . . . . An embodiment of a dot pattern for a phyllotactic array 802 having 200 elements 804 is shown in FIG. 8.

With such an array, the optimum photosensitive element size is the Voronoi diagram for the photosensitive element centers (a Wigner-Seitz cell). Thus, the array 902 would have a photosensitive element 904 arranged in a pattern like that shown in FIG. 9.

Such a phyllotactic array 902 has no strong peaks in its Fourier spectrum, but has roughly average photosensitive element size 904. It would thus be resistant to aliasing when used on a patterned surface. By using the weighting coefficients computed from the coordinates given above, it should be possible to extract any number of 1D SQ-pairs from this one array.

A possible limitation to a 3-axis 2D array, such as shown in FIG. 7, is that for any one axis, the distribution of photosensitive elements that contribute to each axis of motion is relatively sparse. A desirable feature of the 2D comb-arrays described previously is that by grouping sums of photosensitive elements appropriately, each element can be made to contribute to both axes of motion, without having to put a separate weighting coefficient on each—which is fairly expensive in terms of chip surface area and power consumption. Thus, it is desirable to have a multi-axis 2D array in which each of the photosensitive elements contribute to a motion signal from every axis.

In particular, the concept can be applied to a 3-axis array similar to that described in FIG. 7. In this 3-axis array, each photosensitive element contributes to all three axes of motion, but there are still only a small number of weighting coefficients that are applied only after the output of groups or rows of elements are summed. Accordingly, this embodiment is the 3-axis analog of the 2D comb-array described above.

Figure 10:
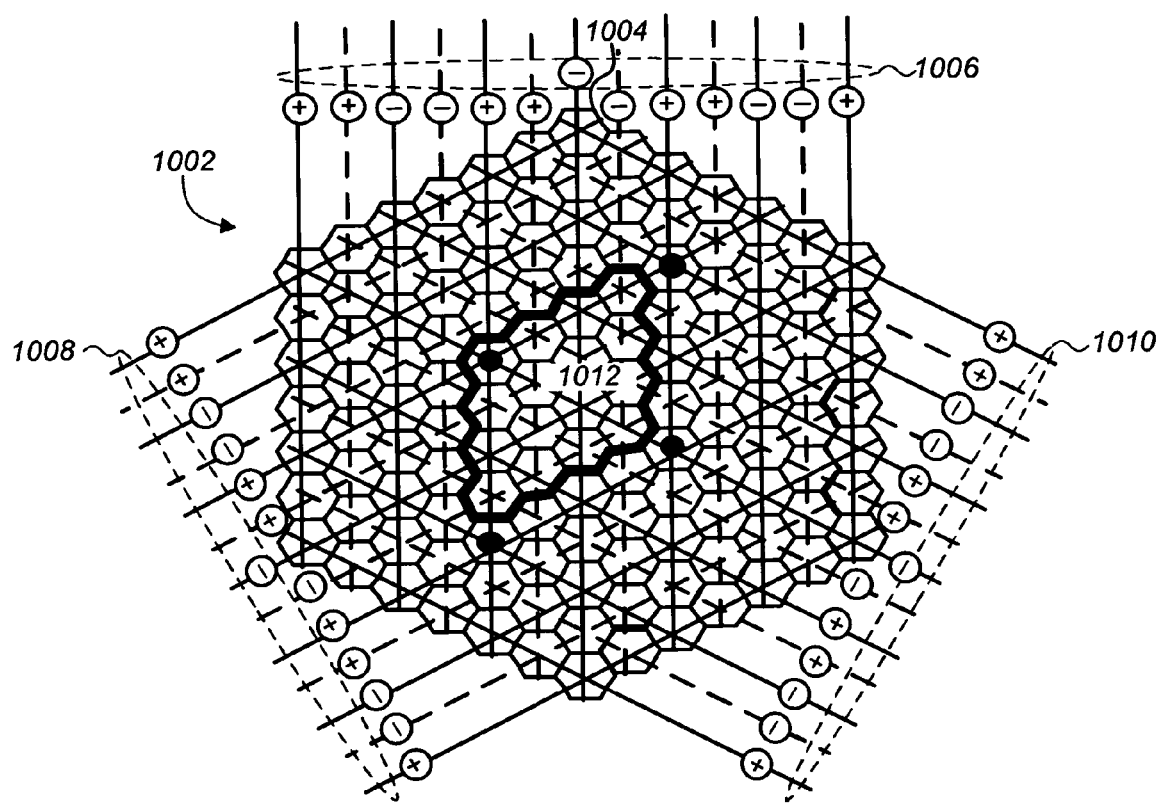
FIG. 10 is a schematic block diagram of an optical sensor having a hexagonal 2D array of hexagonal photosensitive elements according to another embodiment of the present invention.

A schematic diagram of one such embodiment of a hexagonal array 1002, wired for 3-axis motion detection is shown FIG. 10. Referring to FIG. 10, each hexagon represents a single photosensitive element 1004, such as a photodiode. Each photosensitive element 1004 in the array 1002 is couple to at least one signal line in each of three groups of signal lines 1006, 1008 and 1010 to detect motion in a direction perpendicular to the signal line. Thus, vertically oriented the signal lines 1006 are for detecting horizontal motion. Note that each of the lines in the groups of signal lines 1006, 1008 and 1010 appear in either a solid or dashed pattern. The solid lines are main or in-phase signal lines for the group, while the dashed lines are for quadrature signal lines. The signs + and − indicate the weighting coefficient of +1 and −1 respectively.

If a photosensitive element 1004 is crossed by a line that means that the element will contribute to a signal that is encoded by the line. In the embodiment shown, every photosensitive element 1004 is crossed by three lines associated with the three different groups of signal lines 1006, 1008 and 1010; that means that each element contributes to a signal for each of the three axes. For example, the photosensitive element 1004 at the very top of the hexagon array 1002 contributes to a main signal of the group of signal lines 1006 with a weighting coefficient −1, to the main signal of the group of signal lines 1008 with a weighting coefficient +1, and to the main signal of the group of signal lines 1010 with a weighting coefficient +1. The photosensitive element just below and to the right contributes to the quadrature signal of the group of signal lines 1006 with a weighting coefficient −1, the quadrature signal of the group of signal lines 1008 with a weighting coefficient +1, and the main signal of the group of signal lines 1010 with a weighting coefficient +1. And so forth.

In principle, with three axes and two types of signal each with two possible weighting coefficients, there would appear to be 64 different possibilities for an element to contribute to each axis. But in fact, there are only 16 possibilities because some combinations do not appear. It can be seen that because the overall pattern is periodic; a heavy black line outlines a unit cell 1012 of the periodic pattern, and there are only 16 elements in the unit cell. So there are basically 16 distinct "flavors" of photosensitive element 1004, each element characterized by the weighting coefficient that applies for each of the three axes and whether it goes to main or quadrature for that axis. (Note that the heavy black dots indicate photosensitive elements of the same flavor or making the same contribution to each axis.) Thus, in the wiring scheme, all photosensitive element 1004 of a given flavor, are wired together giving 16 output signals. The signal from each flavor can be split three ways, the weighting coefficient appropriate to each of the 3 signals applied, and then combine the output signals into main and quadrature signals for each of the three axes.

The above embodiment enables the acquisition of 3-axis information that can be combined to give resistance to fading in any single axis, and enable the use of each photosensitive element 1004 in all three axes, giving better SNR and better resistance to aliasing than arrays in previous speckle-based optical sensors.

It's also possible to apply the above approach to a square array of photosensitive elements and get four axes of information by exploiting the idea of using different spatial frequencies in the array. In particular, four axes can be derived from a square 2D array, similar to that of FIGS. 5A and 5B, essentially by adding more connections to the photosensitive elements. An embodiment of this will be described with reference to FIG. 11.

Figure 11:
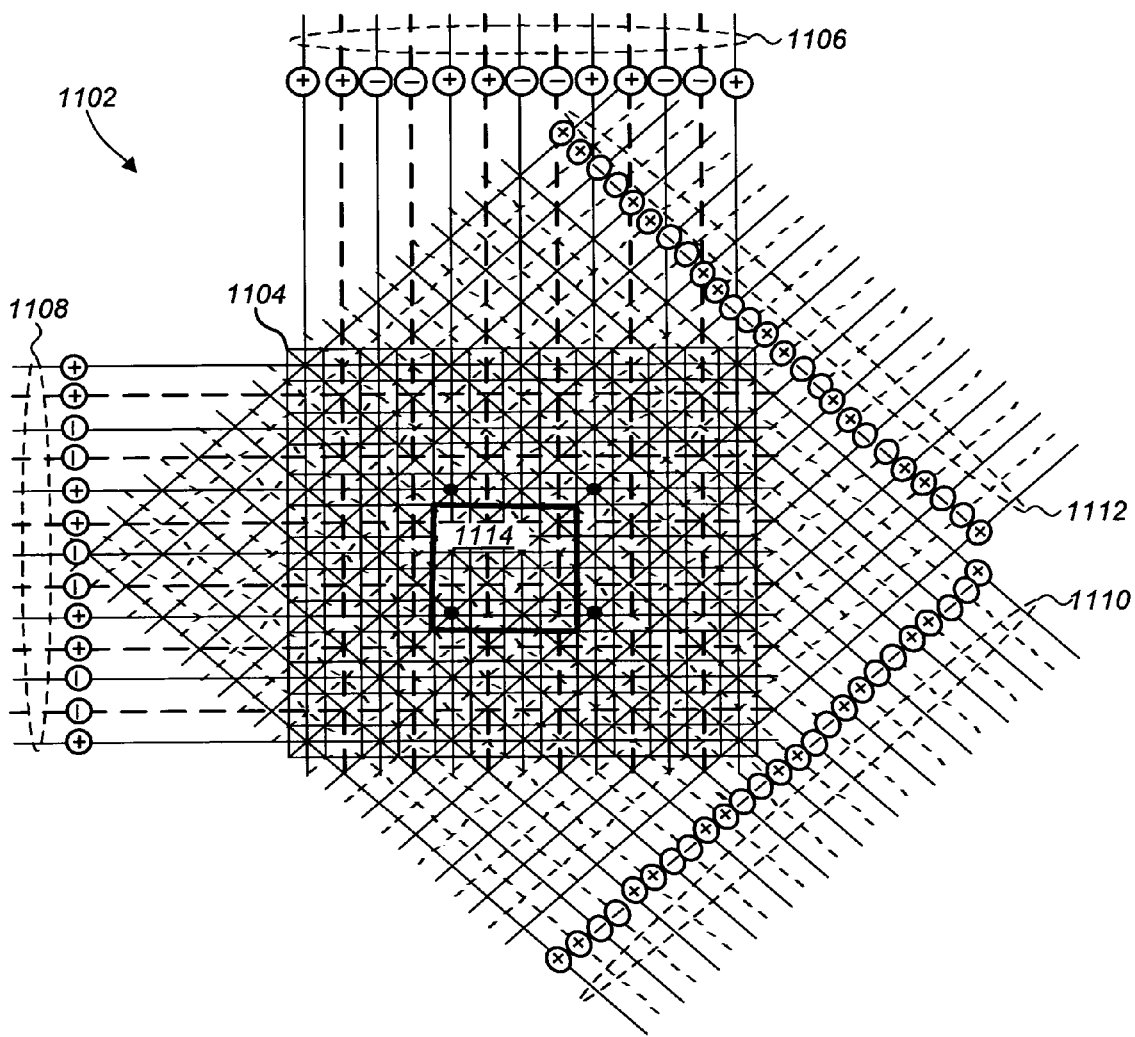
FIG. 11 is a schematic block diagram of an optical sensor having a square 2D array wired for 4-axis motion detection according to an embodiment of the present invention.

FIG. 11 shows a square, 2D array 1102 and wiring diagram for four axes of motion detection. The connection of photosensitive elements 1104 is similar to that describe with reference to FIG. 10, but there are now four directions, and each photosensitive element contributes to either main (in-phase) or quadrature signals in each of the four directions. A first group of signal lines 1106 couple to all photosensitive elements to detect motion in a horizontal direction. A second group of signal lines 1108 is connected to detect vertical movement, a third group of signal lines 1110 is connected to detect movement in a direction −45° from vertical, and a fourth group of signal lines 1112 is connected to detect movement in a direction +45° from vertical. It is noted that the signal lines in the groups of signal lines 1110 and 1112 are spaced more closely together than in groups of signal lines 1106 and 1108. This is an indication that they are detecting a different, higher spatial frequency than the groups of signal lines 1106 and 1108. Once again, each of the lines in the groups of signal lines 1106, 1108, 1110 and 1112 appear in either a solid or dashed pattern. The solid lines are main or in-phase signal lines for the group, while the dashed lines are for quadrature signal lines. The signs + and − indicate the weighting coefficient of +1 and −1 respectively.

A heavy black line outlines a unit cell 1114 of the periodic pattern, and there are 16 photosensitive elements in the unit cell. So there are basically 16 distinct "flavors" of photosensitive element 1104, each element characterized by the weighting coefficient that applies for each of the axes and whether it goes to main or quadrature for that axis. Again, the heavy black dots indicate photosensitive elements of the same flavor or making the same contribution to each axis. After combining all photosensitive elements 1104 of a single flavor, the signal from each flavor is split four ways and routed, with the appropriate weighting coefficient, to main and quadrature signals for each of the four axes.

It should be noted that this concept can be generalized to any periodic array; by superimposing multiple periodic grids on the array. For example, one can extract multiple direction vectors, using all detectors in each calculation, without having to add individual weighting coefficients. One could also add more directions to this array based on other periodicities within the array; the number of flavors of cell climbs significantly, of course.

In summary, methods for measuring displacements in 2D using light-dark patterns on a 2D array, and various embodiments of that array have been described. In general, the method employs a two-dimensional array of pixels or photosensitive elements connected in a fashion that enables simplified, signal processing of a given spatial frequency that is of primary importance for the given displacement-measurement application. Various embodiments of the pixel-connection scheme can be implemented to allow processing of different (or multiple) spatial frequencies. This method allows 2D speckle-based displacement measurements with lower power required from signal processing electronics than in 2D correlation type devices, and without compromising measurement accuracy as in prior devices using linear, 1D comb-arrays.

The foregoing description of specific embodiments and examples of the invention have been presented for the purpose of illustration and description, and it is not to be construed as being limited thereby. They are not intended to be exhaustive or to limit the invention to the precise forms disclosed, and many modifications, improvements and variations within the scope of the invention are possible in light of the above teaching. It is intended that the scope of the invention encompass the generic area as herein disclosed, and by the claims appended hereto and their equivalents.

What is claimed is:

1. A method for detecting motion of an optical sensor relative to a surface along a plurality of directions, the method comprising steps of:
    generating sets of signals responsive to motion along each of at least a first, second, and third direction, said directions not necessarily all different, each of said sets of signals consisting of a plurality of signals, said plurality including a main signal and one or more secondary signals, said main and secondary signals representing at least partially independent components of a complex signal whose complex phase changes in response to motion along one of said directions, wherein the sets of signals are generated from an array including a plurality of groups of photosensitive elements, which serve as a filter on spatial frequencies of light received on the array, and wherein at least one set of the sets of signals is generated using a spatial frequency different from that of the remaining sets of signals;
    combining said sets of signals to generate a first complex signal for each of said directions at a first time;
    combining said sets of signals to generate a second complex signal for each of said directions at a second time subsequent to said first time;
    computing a third complex signal for each of said directions wherein each of said third complex signals is a predicted value for each of said second complex signals, said predicted signal depending on a number of values representing distance moved; and
    determining the optimum values of said values representing distance moved by the step of minimizing the differences between said second and third complex signals.

2. A method according to claim 1, wherein each set of the sets of signals is generated using a spatial frequency different from that of the other sets of signals.

3. A method according to claim 1, wherein the sets of signals are generated from an array including a plurality of interlaced groups of photosensitive elements.

4. A method according to claim 1, wherein the sets of signals are generated from a plurality of spatially separate arrays of photosensitive elements.

5. A method according to claim 4, wherein the plurality of spatially separate arrays include at least two arrays responsive to motion along different, non-parallel axes.

6. A method according to claim 1, wherein the sets of signals are generated from a two-dimensional array of a plurality of photosensitive elements, said photosensitive elements including at least two interlaced groups of photosensitive elements arranged along different, non-parallel axes.

7. A method according to claim 1, further comprising the step of filtering the complex signals to suppress noise over a predetermined sample interval.

8. A method according to claim 7, wherein the step of filtering the complex signals comprises the step of Kalman filtering.

9. A system for detecting motion along a plurality of directions, said system comprised of:
    means for generating main and secondary signals responsive to motion along a first, second, and at least third direction, said directions not necessarily all different, wherein the means for generating main and secondary signals comprises an array including a plurality of groups of photosensitive elements, which serve as a filter on spatial frequencies of light received on the array, and wherein the array includes groups of photosensitive elements coupled to generate at least two sets of main and secondary signals at spatial frequencies different from one another;
    means for combining said main and secondary signals to generate a first complex signal for each of said directions at a first time;
    means for combining said main and secondary signals to generate a second complex signal for each of said directions at a second time subsequent to said first time;
    means for computing a third complex signal for each of said directions wherein each of said third complex signals is a predicted value for each of said second complex signals, said predicted signal depending on a plurality of values representing distance moved; and
    means for determining the optimum values of said values representing distance moved by the step of minimizing the differences between said second and third complex signals.

10. A system according to claim 9, wherein the means for generating main and secondary signals comprises a plurality of spatially separate arrays of photosensitive elements, and wherein the plurality of spatially separate arrays include at least two arrays oriented along different, non-parallel axes.

11. A system according to claim 9, wherein the means for generating main and secondary signals comprises a two-dimensional array of a plurality of photosensitive elements, said photosensitive elements including at least two interlaced groups of photosensitive elements arranged along different, non-parallel axes.

12. A method for detecting movement of a surface relative to an optical sensor having an array of photosensitive elements, the method comprising steps of:
generating at least two sets of signals responsive to motion of light received on the array in a first direction, wherein the array includes a plurality of groups of photosensitive elements to filter spatial frequencies of light received on the array, and wherein at least one set of the sets of signals is generated using a spatial frequency different from that of the other set of signals;
combining said sets of signals at a first time to generate a first complex signal;
combining said sets of signals at a second time subsequent to said first time to generate a second complex signal;
computing a predicted value for said second complex signal based on the first complex signal and a number of values representing distance moved; and
determining a value of distance moved in the first direction by minimizing the differences between said second complex signal and the predicted value for the second complex signal.

13. A method according to claim 12, wherein each signal of the sets of signals is generated from a plurality of spatially separate of photosensitive elements oriented along parallel axes within the array.

14. A method according to claim 12, wherein the step of generating at least two sets of signals comprises the step of generating at least three sets of signals responsive to motion of light received on the array in the first direction and in a second direction, and wherein the step of determining the value of distance moved further comprises the step of determining a value of distance moved in the second direction.

* * * * *